(12) United States Patent
Lambino et al.

(10) Patent No.: US 6,591,352 B2
(45) Date of Patent: Jul. 8, 2003

(54) METHOD AND APPARATUS FOR EXECUTING FIRMWARE FROM A VALID STARTUP BLOCK

(75) Inventors: John P. Lambino, Beaverton, OR (US); John V. Lovelace, Irmo, SC (US)

(73) Assignee: Intel Corporation, Santa Clara, CA (US)

( * ) Notice: Subject to any disclaimer, the term of this patent is extended or adjusted under 35 U.S.C. 154(b) by 24 days.

(21) Appl. No.: 09/871,035

(22) Filed: May 31, 2001

(65) Prior Publication Data

US 2002/0184435 A1 Dec. 5, 2002

(51) Int. Cl.[7] .............................................. G06F 12/00
(52) U.S. Cl. ........................ 711/166; 711/103; 711/154
(58) Field of Search ................................. 711/103, 154, 711/166

(56) References Cited

U.S. PATENT DOCUMENTS

| | | | | |
|---|---|---|---|---|
| 5,524,245 A | * | 6/1996 | Zarrin et al. ................... 713/2 |
| 5,606,660 A | * | 2/1997 | Estakhri et al. ................ 714/38 |
| 5,717,887 A | * | 2/1998 | Leslie .......................... 717/173 |
| 5,878,256 A | * | 3/1999 | Bealkowski et al. ......... 711/103 |
| 6,219,828 B1 | * | 4/2001 | Lee .............................. 711/102 |
| 6,237,091 B1 | * | 5/2001 | Firooz et al. ................. 709/222 |
| 6,357,021 B1 | * | 3/2002 | Kitagawa et al. ............. 714/38 |
| 2002/0095625 A1 | * | 7/2002 | Ahrens et al. ................ 714/44 |

FOREIGN PATENT DOCUMENTS

EP           1 002099 A2  *  5/1999

* cited by examiner

Primary Examiner—Reba I. Elmore
(74) Attorney, Agent, or Firm—Paul E. Steiner

(57) ABSTRACT

A startup program for protecting against corruption of firmware resides in multiple blocks of a firmware device in a processor-based system. While the firmware device typically stores code, the device may additionally store data that is accessible to application programs. The startup program confirms that the block from which it executes is a valid startup block. If the block is not a valid startup block, the startup program searches the other blocks in the firmware device for a valid startup block. Upon identifying a valid startup block, the startup program sets an execution address such that subsequent initialization of the processor-based system occurs from the startup block.

20 Claims, 5 Drawing Sheets

METHOD AND APPARATUS FOR EXECUTING FIRMWARE FROM A VALID STARTUP BLOCK

BACKGROUND

This invention relates to firmware for a processor-based system, and, more particularly, to a mechanism for assuring proper execution of the firmware.

A processor-based system typically includes firmware for initializing the system. Firmware refers to both code that is permanently or semi-permanently resident in the processor-based system and the hardware device used to store the code. As used herein, "firmware" refers to the code while "firmware device" refers to the hardware device. Usually, the code is "burned" into a read-only memory (ROM) or a flash memory device. The ROM or flash devices may be removable integrated circuits (ICs) that plug into a dedicated chip slot in the system board.

Although the firmware device may be removable and, thus, physically replaced, more typically, the firmware device is re-programmed in place, e.g., without physical removal. ROMs may be programmable (PROMs), erasable (EPROMs), and electrically erasable (EEPROMs), such as flash memory. Flash memory may typically be programmed at a faster rate than other EEPROMs.

Like other software, the firmware itself is a valuable component of the processor-based system. Firmware is the very first code executed in the system. The firmware initializes the key hardware components. Once the system is initialized, the firmware typically loads an operating system loader program into memory. The loader program then loads the operating system.

The firmware comprises part of the identity of the processor-based system. Many computer manufacturers, for example, include a proprietary firmware that includes features and capabilities that may distinguish the processor-based system from those of other manufacturers.

Because flash memory is typically expensive relative to other circuitry, the flash memory may be shared. In addition to the firmware program, other programs or even non-executable data, may be stored in the flash memory.

Further, in some processor-based systems, programs such as the firmware program may be executed from more than one address in the flash memory. The availability of more than one execution address, as well as the co-mingling of executable and non-executable data in the flash memory may impair security of and even operation of the processor-based system.

Thus, there is a continuing need to assure execution of a firmware program when powering on a processor-based system.

DETAILED DESCRIPTION

According to the embodiments described herein, a system includes a mini-boot program to assure successful initialization of the system during power-on. The mini-boot program operates from within one or more blocks of a firmware device such as a flash memory. The mini-boot program ensures that the firmware operates from a valid startup block. If not, the mini-boot program identifies a valid startup block from the blocks in the firmware device. The mini-boot program also resets an address select such that subsequent power-on of the system will proceed from the newly discovered startup block.

Figure 1:
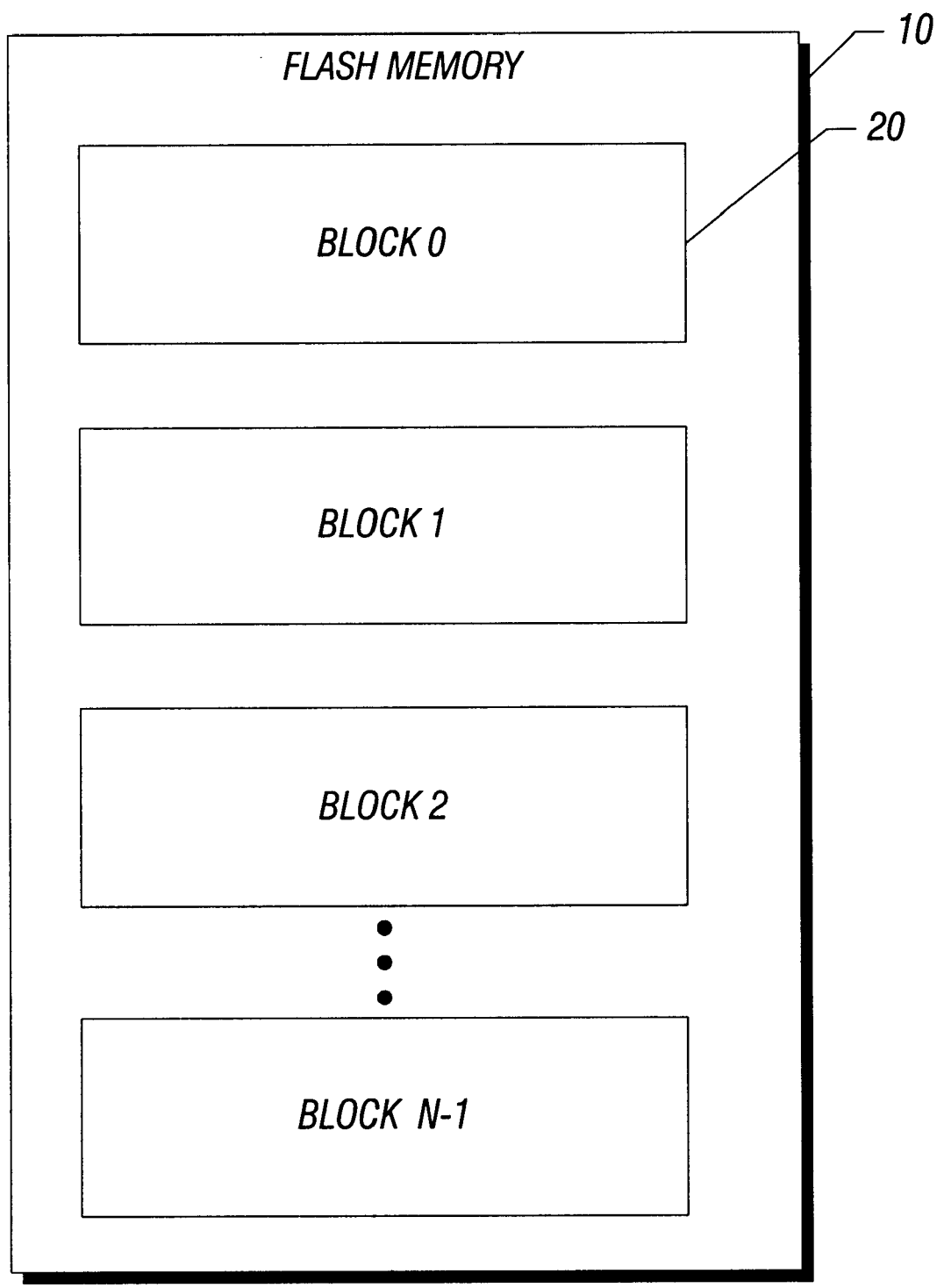
FIG. 1 is a diagram of a flash memory or other firmware device according to one embodiment of the invention.

In FIG. 1, a flash memory or other firmware device 10 according to one embodiment includes a plurality of blocks 20. The blocks 20 may include firmware for powering on a typical processor-based system. A block 20 including a firmware power-on program is known as a startup block. Alternatively, the firmware device 10 may comprise a firmware array, including a plurality of independently selectable devices.

Increasingly, the flash memory 10 may be used to store data other than firmware. Flash memory tends to be expensive, and, accordingly, optimal use of the flash memory 10 may include sharing space between firmware and other data. One or more blocks 20 of the flash memory 10 may include non-executable data, such as tables, for example. Such data may be accessible to routines other than the firmware program, such as by application programs during run-time operation of a processor-based system.

Figure 2:
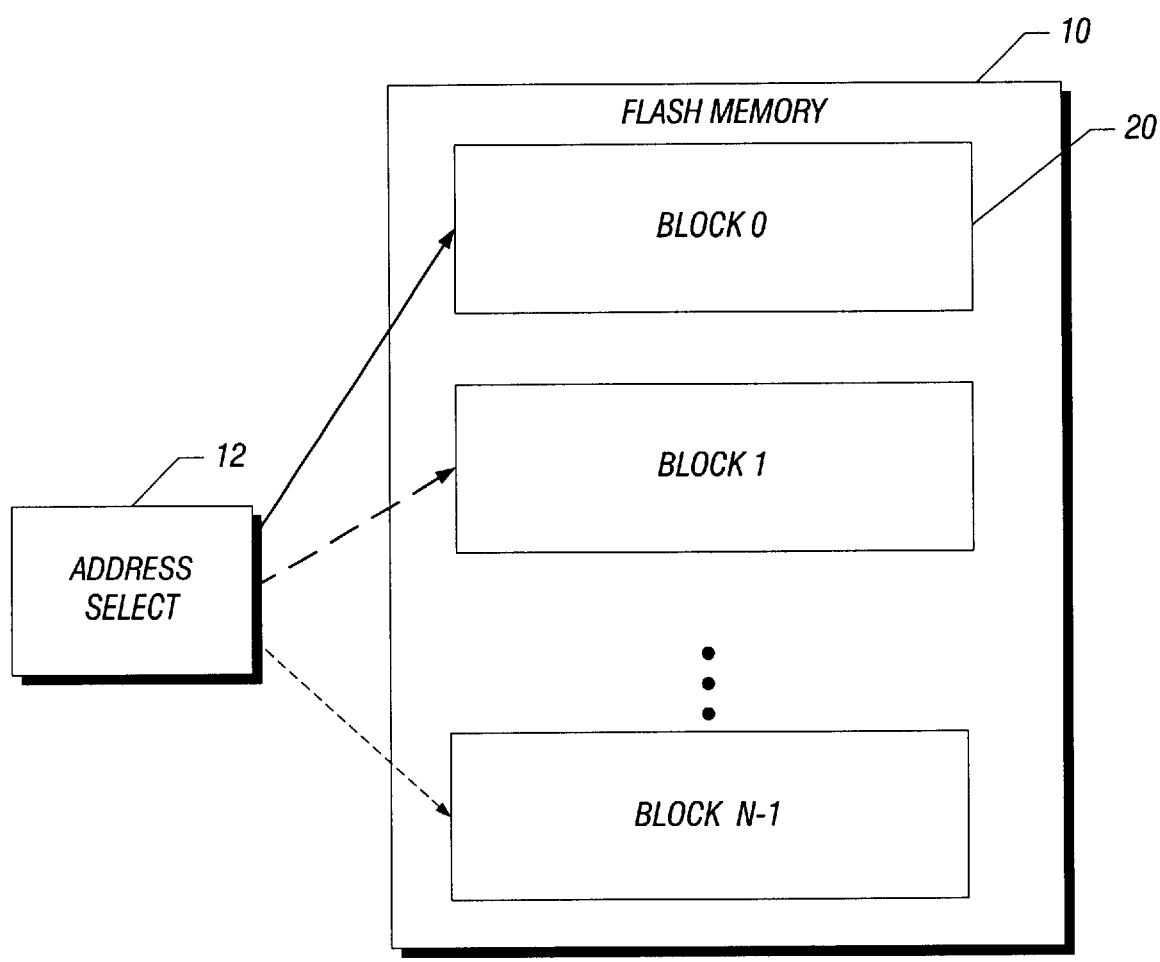
FIG. 2 is a diagram of an address select for selecting a block of the flash memory or other firmware device according to one embodiment of the invention.

Increasingly, as depicted in FIG. 2, mechanisms are available for distinctly accessing the various blocks 20 of the flash memory 10. In FIG. 2, for example, an address select 12 enables alternative access to each of the blocks 20 of the flash memory 10. The address select 12 may, for example, select which block 12 is the startup block, e.g., the block 20 to be executed at power-on.

The address select 12 may be as simple as a bit inversion mechanism, as one example. Alternatively, the address select 12 may perform a device select, wherein each block 20 is regarded as a distinct device. Where a block 20 contains data accessible to an application program, the application program may invoke the address select 12 in order to access the desired block 20.

In an environment where the flash memory 10 includes, not just executable power-on code, but also may include non-executable data, surreptitious or unintentional modification of the address select 12 may produce fatal results. Where the address select 12 points to a non-executable block 20, a processor-based system including the elements of FIG. 2 experiences a "hang" or hard failure condition. Furthermore, such a system is vulnerable to attack such as by virus software.

Figure 3:
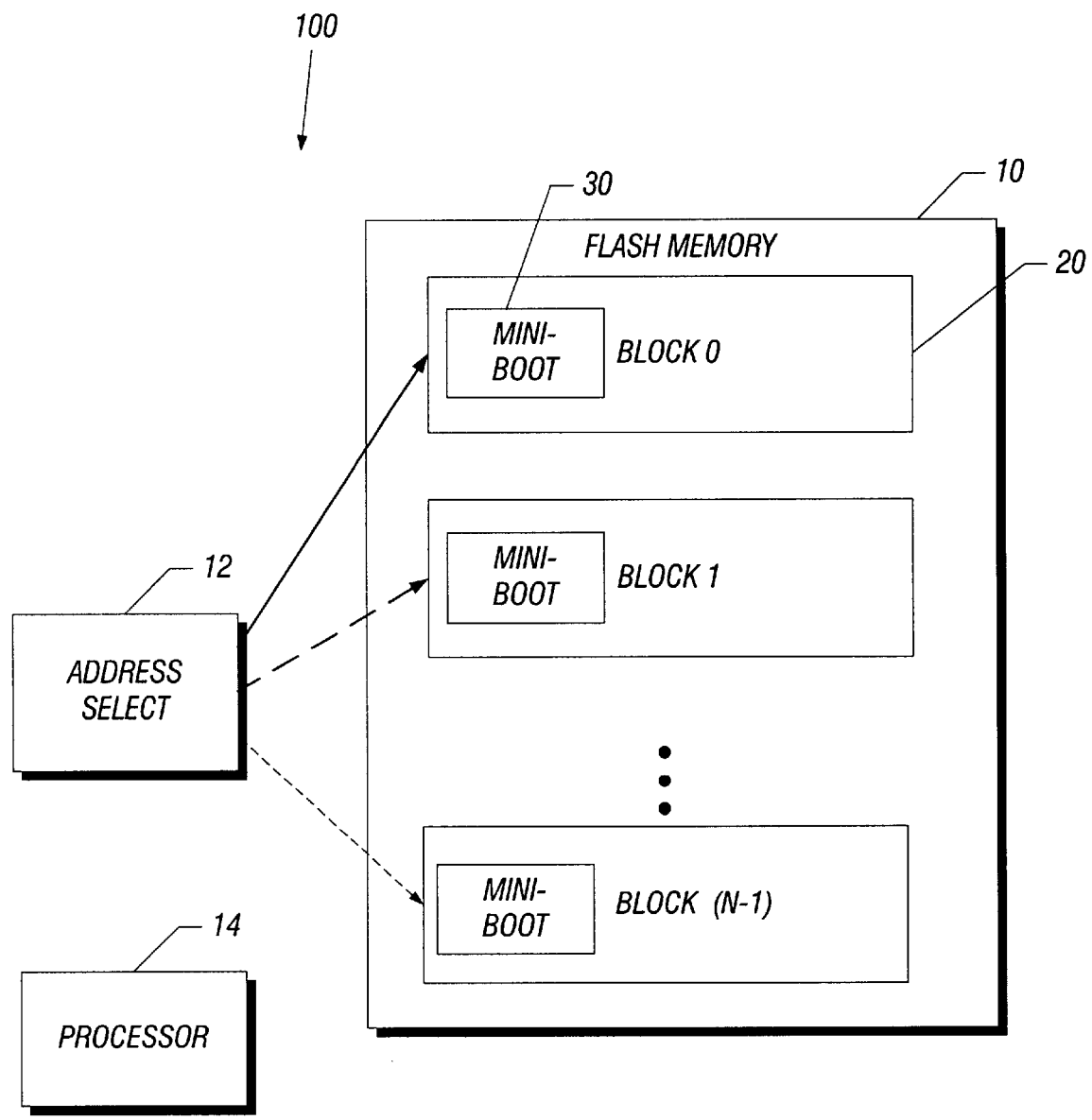
FIG. 3 is a block diagram of a system according to one embodiment of the invention.

In FIG. 3, a system 100 according to one embodiment of the invention includes a processor 14 for executing firmware and other programs. The system 100 also comprises the flash memory or other firmware device 10 comprising one or more blocks 20, as well as the address select 12 of FIG. 2. Furthermore, each block 20 of the flash memory 10 includes a mini-boot block 30. A mini-boot block 30 is a small portion of code, which ensures that, no matter which block 20 the address select 12 indicates, executable code will be executed.

In one embodiment, the mini-boot block 30 authenticates the current startup block 20 from which a processor 14 is executing. The mini-boot block further validates the block 20 from which the mini-boot 30 is executing, if different from the startup block. If the block 20 is deemed not valid, the mini-boot 30 locates a valid block from somewhere in the flash memory 10. The mini-boot 30 then makes the valid block the startup block by changing the address select 12. This ensures that, on subsequent power-on of the system 100, the processor 14 will begin executing from a valid block 20 of the flash memory 10.

Figure 4:
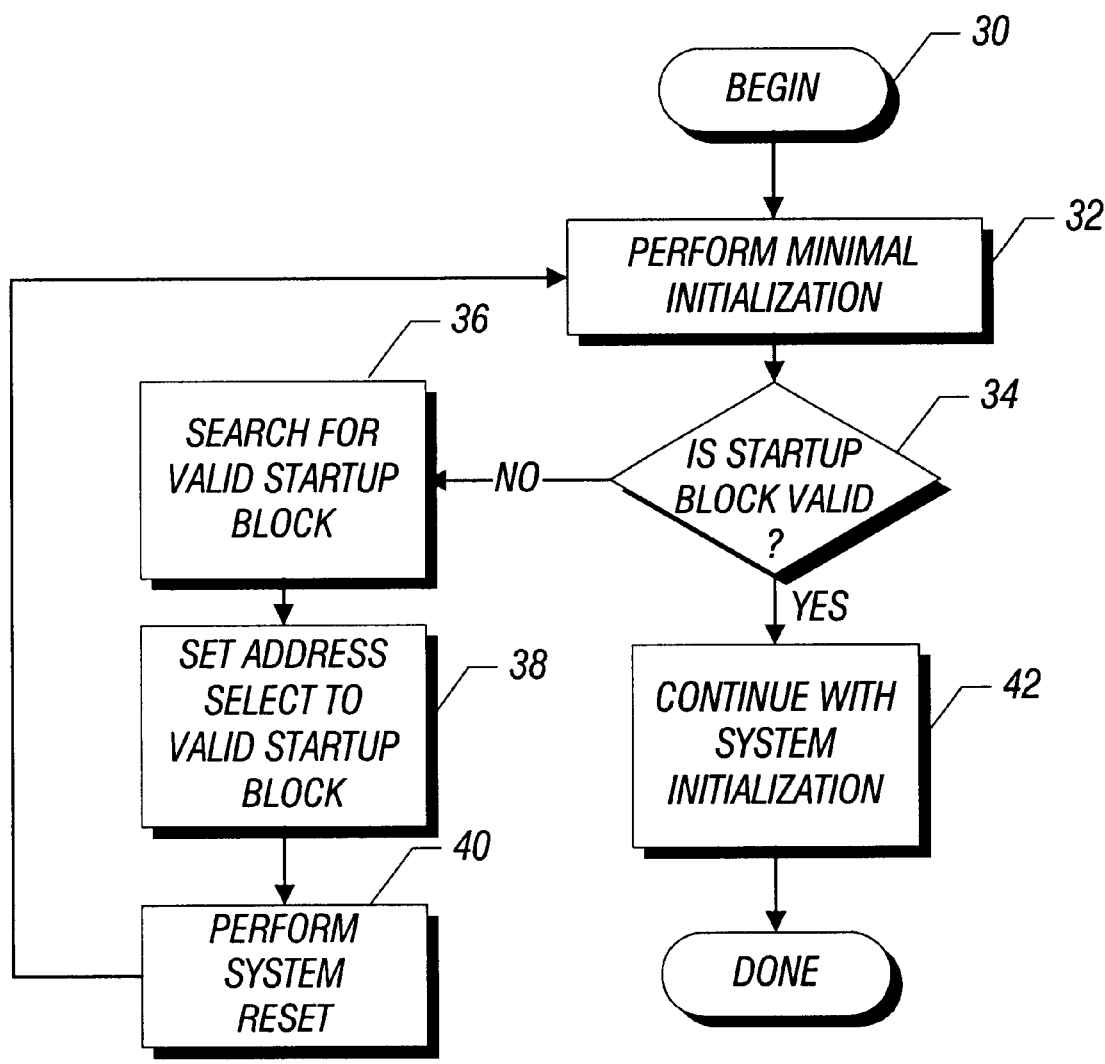
FIG. 4 is a flow diagram of operation of the system according to one embodiment of the invention.

Operation of the mini-boot 30, according to one embodiment, is depicted in the flow diagram of FIG. 4. Initially, the mini-boot 30 performs minimal initialization of the system 100 (block 32). Next, the mini-boot 30 determines whether the block 20 from which the mini-boot 30 is being executed (the de facto startup block) is valid (diamond 34).

Such validation may be performed in a number of ways. For example, the mini-boot 30 may perform a checksum, a cyclic redundancy check (CRC), or a digital signature of the block 20 to determine whether the block 20 is valid. Alternatively, a one-way hash function may be performed on the block 20. The block 20 may also be validated by determining that its contents comprise code, not data. Various mechanisms for discerning between code and data are known to those of ordinary skill in the art.

For example, in one embodiment, each mini-boot 30 is assigned a unique identifier in which a first identifier indicates a startup block, a second identifier indicates a code block, a third identifier indicates a data block, and so on. Validation occurs by scanning the mini-boot for the unique identifier and confirming that the mini-boot constitutes a startup block and, if not, a code block. Alternatively, confirming that the unique identifier is not a data block may be sufficient to validate the mini-boot, in one embodiment.

Where the startup block 20 is deemed valid by the mini-boot 30, initialization of the system 100 proceeds as normal (block 42). Where the startup block 20 is determined to not be valid, however, the mini-boot 30 performs a search of other blocks 20 in the flash memory 10, looking for a valid startup block (block 36).

Once a valid startup block is found, according to one embodiment, the mini-boot 30 sets the address select 12 to indicate the valid startup block (block 38). Subsequently, a system reset may be performed (block 40). When the system 100 powers on after the reset, the mini-boot 30 residing in the newly selected startup block 20 will be executed and the process of FIG. 4 may begin again.

Figure 5:
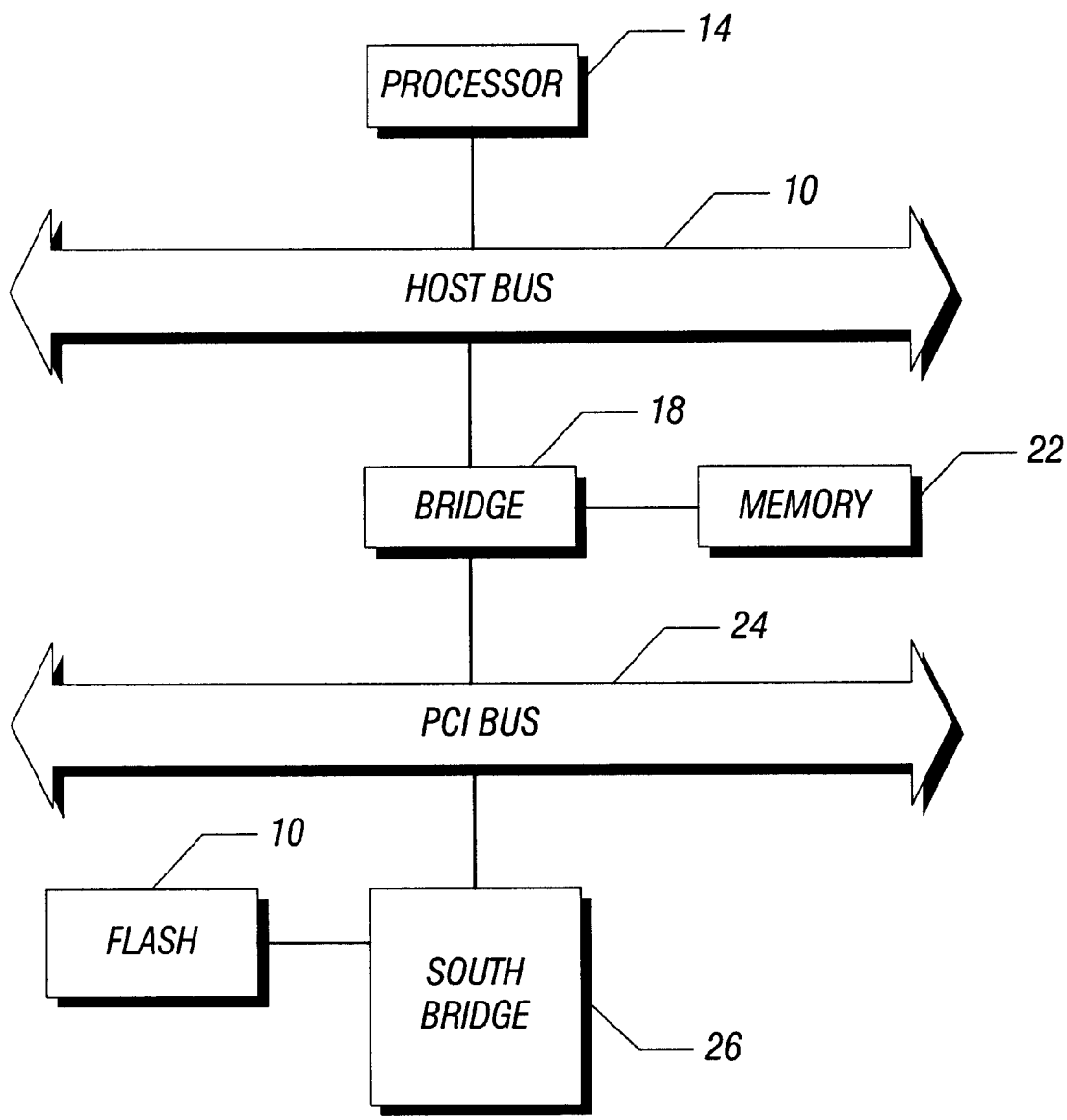
FIG. 5 is a component layout of the system according to one embodiment of the invention.

A component layout of the system 100, according to one embodiment, is depicted in FIG. 5. The processor 14 is coupled to a bridge 18 by a host bus 16, which connects the processor 14 to other parts of the system 100. The bridge 18, which may support a memory 22, is coupled between the host bus 16 and a PCI bus 24, according to one embodiment.

In one embodiment, the system 100 further includes a south bridge 26. The south bridge 26 is a multifunction bridge, which supports the flash memory or other firmware device 10, including the mini-boot 30. The south bridge 26 is coupled to the bridge 18 by the PCI bus 24. The PCI Specification is available from The PCI Special Interest Group, Portland, Oreg. 97214. The PCI bus is a high-performance bus for connecting I/O processors, buses, controllers, and the like.

In one embodiment, the system 100 includes mini-boot 30 for each possible indication (selection) of the address select 12. This ensures that, no matter what position the address select 12 assumes, the system 100 will execute intended instructions (e.g., the mini-boot 30). Further, the mini-boot 30 corrects the operation of the system 100 so that a valid startup block 20 is executed during a subsequent power-on of the system 100.

In one embodiment, the mini-boot is quite small, less than 256 bytes. By keeping the mini-boot 30 small, multiple copies of the mini-boot may reside on the flash memory 10, without severely impairing the ability to store programs of a more substantial size, such as the firmware of the system, as well as non-executable data, such as tables.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   executing a program from a block of a firmware device in a processor-based system, wherein the firmware device comprises a plurality of blocks and the program resides on each block;
   determining that the block is not a startup block; and
   setting an execution address to select a second block of the plurality of blocks, wherein the second block is a startup block.

2. The method of claim 1, further comprising:
   performing a reset of the processor-based system; and
   executing the program from the startup block.

3. The method of claim 1, determining that the block is not a startup block further comprising:
   identifying a unique identifier within the block; and
   determining that the block comprises data.

4. The method of claim 1, determining that the block is not a startup block further comprising performing a checksum on the block.

5. A method comprising:
   identifying a plurality of blocks in a flash memory device by a program executing from a first block of the plurality of blocks;
   determining that the first block is not a startup block;
   identifying a second block of the plurality of blocks, wherein the second block comprises the program;
   determining that the second block is a startup block; and
   modifying an address select to select the second block.

6. The method of claim 5, further comprising:
   executing the program from the second block.

7. A system comprising:
   a processor;
   a firmware device comprising a plurality of blocks, wherein at least one block is a startup block; and
   an address select to enable the processor to execute from any of the plurality of blocks;
   wherein the processor executes the startup program in a first block of the plurality of blocks, and the startup program:
     determines that the first block is not a startup block;
     identifies a second block of the plurality of blocks;
     determines that the second block is a startup block; and
     modifies the address select to select the second block.

8. The system of claim 7, wherein the startup program further performs a system reset.

9. The system of claim 8, wherein the startup program is executed from the second block.

10. The system of claim 7, wherein each block comprises the startup program.

11. The system of claim 7, wherein the firmware device is a flash memory.

12. An article comprising a medium storing instructions for enabling a processor-based system to:
 execute a program from a block of a firmware device, wherein the firmware device comprises a plurality of blocks and the program resides on each block;
 determine that the block is not a startup block; and
 set an execution address to select a second block of the plurality of blocks, wherein the second block is a startup block.

13. The article of claim 11, further storing instructions for enabling the processor-based system to:
 perform a system reset; and
 execute the program from the startup block.

14. An article comprising a medium storing instructions for enabling a processor-based system to:
 identify a plurality of blocks in a flash memory device by a program executing from a first block of the plurality of blocks;
 determine that the first block is not a startup block;
 identify a second block of the plurality of blocks, wherein the second block comprises the program;
 determine that the second block is a startup block; and
 modify an address select to select the second block.

15. The article of claim 13, further storing instructions for enabling the processor-based system to:
 execute the program from the second block.

16. A system comprising:
 a processor;
 a firmware array comprising independently selectable devices, wherein at least one device comprises a startup block; and
 a device select to enable the processor to execute from any device of the firmware array;
 wherein the processor executes the startup program in a first device of the firmware array, and the startup program:
  determines that the first device does not comprise a startup block;
  identifies a second device of the firmware array;
  determines that the second device comprises a startup block; and
  modifies the device select to select the second device.

17. The system of claim 16, wherein the startup program further performs a system reset.

18. The system of claim 17, wherein the startup program is executed from the second device.

19. The system of claim 16, wherein each device comprises the startup program.

20. The system of claim 16, wherein the firmware device is a flash memory.

* * * * *